Patented Oct. 5, 1943

2,330,908

UNITED STATES PATENT OFFICE 2,330,908

MANUFACTURE AND USE OF AZO DYESTUFFS

Henry Charles Olpin and Edmund Stanley, Spondon, near Derby, England, assignors to Celanese Corporation of America, a corporation of Delaware No Drawing. Application July 9, 1940, Serial No. 344,604. In Great Britain September 14, 1939

12 Claims. (Cl. 260—152)

This invention relates to the production of new azo dyes in substance or on a substratum and more particularly to the colouration of textile materials made of or containing cellulose acetate or other cellulose ester or ether, especially by the azoic process.

According to the invention valuable water-insoluble azo dyes are obtained by coupling a tetrazotised aromatic di-primary-amine with an arylamide of a 3-hydroxy-2-carboxy di-phenylene oxide. In addition to the hydroxy and the carboxylic arylamide groups other substituents may be present in the diphenylene oxide radicle, providing that any additional substituents are not such as to induce water-solubility in the azo dye or to condition coupling with a diazo component in any position other than the 4-position of the diphenylene oxide radicle. The di-primary-amine also must be free from groups which would induce water-solubility in the azo dye.

The azo dyes may be formed in substance but the invention is, as mentioned above, more particularly concerned with the formation of the dyes on textile or other materials, especially cellulose ester or ether materials, by the azoic process. Valuable dark shades of good fastness properties may thus be produced.

The use of a di-primary-amine as diazo component generally leads to darker and richer shades than those obtainable with a mono-amine. In particular, by suitable choice of components rich dark brown shades may be produced.

Advantageously, a 4:4'-diamino azobenzene or other 4:4'-diamino azo compound is used as the diazo component, for example 4:4'-diamino-azo-benzene, 4:4'-diamino-2-chlor-5'-methoxy-2'-methyl-azobenzene, 4:4'-diamino-2-methyl-azobenzene 4:4'-diamino-2-chlor-azobenzene, 4:4'-diamino-2-methyl-5-methoxy azobenzene and 4:4'-diamino-1:1'-benzene-azonaphthalene. Trisazo dyes may thus be produced. However, other diamines may be used, for example benzidine, tolidine, dianisidine, and 4:4'-diaminodiphenylamine.

The arylamide of the 3-hydroxy-2-carboxy-diphenylene oxide which is used as coupling component may be derived from any desired aromatic amine whether of the benzene or naphthalene or other series. As examples of suitable amines mention may be made of anilino, ortho- or para-toluidine, xylidines and the halogen, nitro or alkoxy substitution products of these amines. Again α- or β-naphthylamine or substitution products thereof may be used. An arylamide which has been found to give especially good results in the process of the invention is the 2':5'-di-methoxy-anilide of 3-hydroxy-2-carboxy-di-phenylene oxide.

As examples of specific combinations giving valuable dark brown shades mention may be made of the dyestuffs derived from the last mentioned coupling component and tetrazotised 4:4'-diamino-azo-benzene or 4:4'-diamino-2-chlor-5'-methoxy-2'-methyl-azo-benzene.

In effecting the colouration of cellulose ester or ether textile materials by formation of the dyes of the invention on the fibre materials may be treated as described in British Specification No. 404,363 and U. S. Patent No. 1,844,350, first with an alkali free dispersion of the coupling component and then with the diazo solution, or the diazo component may first be applied from a dispersion, diazotised on the materials and thereafter developed or if desired both diazo component and coupling component may be applied from dispersion to the materials and diazotisation and coupling effected thereon. In the latter case the amine and coupling component may be applied together or separately as may be desired or convenient. Advantageously, however, instead of using an alkali-free dispersion of a coupling component a small amount of alkali may be present. In either case whether the coupling component is applied from an alkaline medium or from an alkali free dispersion it is in practice found particularly advantageous to apply both diazo and coupling components from a single bath. Where both components are applied to the materials prior to the diazotisation the latter may be effected by treating the materials with a nitrite solution acidified with a suitable acid, for example acetic acid. The presence of acid during the coupling is best avoided and to this end in order to complete the coupling after diazotisation the materials may be subjected to an alkaline treatment, particularly to the action of a weakly alkaline bath such as a very dilute sodium carbonate solution.

As dispersing agents and/or protective colloids there may be used in the dye-bath Turkey red oil and/or a sulphonated or sulphated fatty alcohol such as oleyl sulphate. Formaldehyde or glucose, preferably the latter, may be added as a stabiliser. Furthermore glucose is of value when alkali is present in that it reduces the risk of saponification of and consequent damage to cellulose acetate and other cellulose ester materials.

As mentioned above, valuable dark shades may be produced by forming the dyes on cellulose ester or ether textiles. Still darker shades may be obtained by forming the dyes on dark coloured cellulose ester or ether materials produced by shaping and setting a solution of a cellulose ester or ether containing a dyestuff as described, for example in U. S. Patent No. 2,128,338, and U. S. applications S. Nos. 221,362, filed July 26, 1938, and 237,469, filed October 28, 1938.

The invention also includes the formation of the dyes in substance, in which form they may be used in printing pastes, as pigments or as additions to artificial silk spinning solution. By shaping and setting the last mentioned solutions coloured filaments, foils, films and like products can be obtained. For example the dyes of the invention may be incorporated in a solution of cellulose acetate in a volatile organic solvent and the product dry spun to form coloured threads. Alternatively, one or both of the components necessary for the formation of the dye may be incorporated in the spinning solution and development of the dyestuff in the formed materials subsequently effected.

The invention is of particular value in connection with the colouration of cellulose acetate materials. It may, however, also be applied to the colouration of other esters of cellulose, for example, cellulose formate, cellulose propionate, cellulose butyrate or cellulose acetate-butyrate or cellulose ethers, for example, ethyl or benzyl cellulose. Further the new dyes may be formed on other types of artificial or natural fibres, for example, cotton or regenerated cellulose.

The invention is illustrated by the following examples:

EXAMPLE 1

*To dye a rich brown shade on cellulose acetate yarn*

For 1 kilo of cellulose acetate yarn the dye-bath is set as follows:

| | |
|---|---|
| Soft water_____litres__ | 40 |
| Dispersing agent_____grams__ | 40 |
| Glucose _____do____ | 60 |
| 2':5' dimethoxyanilide of 3-hydroxy-2-carboxy-diphenylene oxide_____grams__ | 30 |
| Caustic soda flakes_____do____ | 20 |
| 4:4' diamino-2-chlor-5' methoxy-2'-methylazobenzene _____grams__ | 10 |

The dispersing agent may be Turkey red oil or of the sulphated fatty alcohol type. The base, 4:4'-diamino-2-chlor-5'-methoxy-2'-methylazobenzene, is dispersed with the aid of a little water and the dispersing agent, while the coupling component, 2':5'-dimethoxyanilide of 3-hydroxy-2-carboxy-diphenylene oxide, is separately dissolved in a small quantity of water containing the caustic soda. After adding these to the dyebath, the yarn is entered and turned for 2 hours at 75° C., rinsed and entered into a fresh bath set with:

| | |
|---|---|
| Glacial acetic acid_____cc. per litre__ | 8 |
| Sodium nitrite_____gms. per litre__ | 4 | the volume ratio of liquor to yarn being 30–40:1. After 30 minutes the yarn is again rinsed and turned in a bath set with

| | |
|---|---|
| Soap_____gms. per litre__ | 1 |
| Sodium carbonate _____do____ | 0.5 | at a temperature of 40° C. and gradually raised to 65° C. till coupling is complete.

The yarn is finally rinsed, finished and dried.

EXAMPLE 2

*To prepare a dark brown dyestuff in substance*

106 gms. of 4:4' diaminoazobenzene are tetrazotised in known manner with 70 gms. of sodium nitrite and 300 ccs. of concentrated hydrochloric acid.

The diazo solution is run with stirring into a solution containing 363 gms. of 2':5'dimethoxyanilide of 3-hydroxy-2-carboxy-diphenylene oxide dissolved in the minimum quantity of caustic soda solution and maintained alkaline throughout the coupling by the addition of sodium carbonate solution. The end point is adjusted in the usual manner by the addition of either diazo solution or coupling component and the dyestuff well washed and dried.

It may then be suitably dispersed by grinding or other means, incorporated in a spinning solution of cellulose acetate and spun to give brown coloured yarns of very good fastness properties.

Having described our invention, what we desire to secure by Letters Patent is:

1. Process for the production of polyazo dyestuffs, which comprises coupling a tetrazotized aromatic di-primary-amino azo compound of the general formula $(NH_2(R').N=N.(R'')NH_2$, wherein R' and R'' are aromatic radicles selected from the group consisting of radicles containing a single benzene nucleus and radicles containing a single naphthalene nucleus and wherein both the amino groups are in the para position to the azo group, with the 2'5'-dimethoxy anilide of 3-hydroxy-2-carboxy-diphenylene oxide.

2. Process for the production of azo dyes, which comprises coupling a tetrazotized 4.4'-diaminoazobenzene with the 2'5'-dimethoxy anilide of 3-hydroxy-2-carboxy-diphenylene oxide.

3. Process for the production of azo dyes, which comprises coupling a tetrazotized 4.4'-diamino-2-chlor-5'-methoxy-2'-methylazobenbene with the 2'5'-dimethoxy anilide of 3-hydroxy-2-carboxy-diphenylene oxide.

4. Process for the production of azo dyes, which comprises coupling tetrazotized 4.4'-diaminoazobenzene with the 2'5'-dimethoxy anilide of 3-hydroxy-2-carboxy-diphenylene oxide.

5. An azo dye obtainable by coupling a tetrazotized aromatic di-primary-aminoazo compound of the general formula $NH_2(R').N=N.(R'')NH_2$, wherein R' and R'' are aromatic radicles selected from the group consisting of radicles containing a single benzene nucleus and radicles containing a single naphthalene nucleus and wherein both the amino groups are in the para position to the azo group, with the 2'5'-dimethoxy-anilide of 3-hydroxy-2-carboxy-diphenylene oxide.

6. An azo dye obtainable by coupling a tetrazotized 4.4'-diaminoazobenzene with the 2'5'-dimethoxy anilide of 3-hydroxy-2-carboxy-diphenylene oxide.

7. An azo dye obtainable by coupling a tetrazotized 4.4' - diamino - 2 - chlor - 5'- methoxy-2'-methylazobenzene with the 2'5'-dimethoxy anilide of 3-hydroxy-2-carboxy-diphenylene oxide.

8. An azo dye obtainable by coupling tetrazotized 4.4'-diaminoazobenzene with the 2'5'-dimethoxy anilide of 3-hydroxy-2-carboxy-diphenylene oxide.

9. Cellulose acetate textile materials colored with an azo dye obtainable by coupling a tetrazotized aromatic di-primary-aminoazo compound of the general formula $NH_2(R').N=N.(R'')NH_2$, wherein R' and R'' are aromatic radicles selected from the group consisting of radicles containing a single benzene nucleus and radicles containing a single naphthalene nucleus and wherein both the amino groups are in the para position to the azo group, with the 2'5'-dimethoxy anilide of 3-hydroxy-2-carboxy-diphenylene oxide.

10. Cellulose acetate textile materials colored with an azo dye obtainable by coupling a tetrazotized 4.4'-diamino-azobenzene with the 2'5'-dimethoxy anilide of 3-hydroxy-2-carboxy-diphenylene oxide.

11. Cellulose acetate textile materials colored with an azo dye obtainable by coupling a tetrazotized 4.4'-diamino-2-chlor-5'-methoxy-2'-methylazobenzene with the 2'5'-dimethoxy anilide of 3-hydroxy-2-carboxy-diphenylene oxide.

12. Cellulose acetate textile materials colored with an azo dye obtainable by coupling tetrazotized 4.4'-diamino-2-chlor-5'-methoxy-2'-methylazobenzene with the 2'5'-dimethoxy anilide of 3-hydroxy-2-carboxy-diphenylene oxide.

HENRY CHARLES OLPIN.
EDMUND STANLEY.